(12) United States Patent
Lloyd

(10) Patent No.: US 7,143,197 B1
(45) Date of Patent: Nov. 28, 2006

(54) METHOD AND SYSTEM FOR MONITORING A TELECOMMUNICATIONS SIGNAL TRANSMISSION LINK

(75) Inventor: Geoffrey D. Lloyd, Chicago, IL (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/573,266

(22) Filed: May 18, 2000

Related U.S. Application Data

(60) Provisional application No. 60/164,226, filed on Nov. 8, 1999.

(51) Int. Cl.
*G06F 15/16* (2006.01)

(52) U.S. Cl. .......... 709/250; 710/260; 710/261; 710/262; 710/263; 710/264; 710/269; 714/1; 714/100

(58) Field of Classification Search .......... 709/221, 709/222, 227, 223–224, 213–214, 250; 370/506, 370/509, 352, 240–253, 230.1, 236; 340/9, 340/14, 452.2, 515; 710/261–269; 714/1, 714/100
See application file for complete search history.

(56) References Cited

U.S. PATENT DOCUMENTS

| | | | | |
|---|---|---|---|---|
| 4,451,916 A | * | 5/1984 | Casper et al. | 714/4 |
| 5,396,495 A | * | 3/1995 | Moorwood et al. | 370/408 |
| 5,539,804 A | * | 7/1996 | Hong et al. | 379/33 |
| 6,333,940 B1 | * | 12/2001 | Baydar et al. | 370/506 |
| 6,466,572 B1 | * | 10/2002 | Ethridge et al. | 370/352 |
| 6,631,414 B1 | * | 10/2003 | Bullock et al. | 709/227 |

OTHER PUBLICATIONS

Dallas Semiconductor DS21354(3.3V) and DS21554(5V) E1 Single Chip Transceivers (SCT) (from www.dalsemi.com 020100); Dallas Semiconductor 3.3V DS21352 and 5V DS21552 T1Single Chip Transceivers (SCT) (from www.dalsemi.com-090999); Conexant CN8394/8395/8398 Quad/x16/Qctal—T1/E1/J1 Framers (Data Sheet—Feb. 2, 2000); PMC-Sierra, Inc. PM8315 TEMUX High Density T1/E1 Framer with Integrated VT/TU Mapper and M13 Multiplexer (Data Sheet Proprietary and Confidential Preliminary Issue 5: Jan. 2000).
Infineon technologies, ICs for Communications, Quad E1/T1/J1 Framer and Line Interface Component for Long and Short Haul Applications, QuadFALC(TM) PEB 22554 Version 1.3 (Preliminary Data Sheet 99-12 DS 1).

* cited by examiner

*Primary Examiner*—John Follansbee
*Assistant Examiner*—Mohammad Siddiqi

(57) ABSTRACT

A system including an event monitor monitoring at least one transmission link. Each event monitor receives transmission link addresses from an address sequencer and transmits related event data to a centralized storage register. The address sequencer also transmits the addresses to the storage register. The event monitor compares new event data for each address with old event data stored by the event monitor. If a difference is detected, the event monitor sends a strobe signal to the storage register, which stores the event data reflecting the difference and the related address data. The strobe signal is also sent to a signaling device, which sends an interrupt signal to cause a microprocessor to read the event and address data from the storage register. Optionally, the signaling device does not send an interrupt signal until a threshold number of strobe signals have been received.

14 Claims, 3 Drawing Sheets

METHOD AND SYSTEM FOR MONITORING A TELECOMMUNICATIONS SIGNAL TRANSMISSION LINK

RELATED APPLICATIONS

This application claims the benefit of U.S. Provisional Application No. 60/164,226, filed Nov. 8, 1999.

FIELD OF THE INVENTION

This invention relates generally to integrated circuitry and particularly to electronic equipment for monitoring the status of transmission links used for transmission of telecommunications signals, such as voice or data signals.

BACKGROUND OF THE INVENTION

Voice and data signals ("telecommunications signals") are presently transmitted from a sender to a receiver, e.g., from telephone to telephone, by a transmission network. The network includes many interconnected transmission links for carrying the signals. In some instances, such transmission links are mechanical devices, such as fiber optic cable or twisted pair copper wiring. In other instances, such transmission links may comprise assigned bandwidth of a radio frequency link (i.e., a radio channel).

Transmission links are connected to monitoring systems at various intervals. Each monitoring system typically includes circuitry, known as a "receive framer," that is part of transmission link monitoring hardware in communication with one or more transmission link(s). For example, an end of a fiber optic cable transmission link may be physically connected to the receive framer, which in many applications is embodied in a printed circuit board. The monitoring system also includes a microprocessor, which performs various tasks, including communication with the receive framers. Such monitoring systems may be located at nodes of a public switched network, at nodes of the Internet, or near an edge of a network, e.g., in a customer's building. Each transmission link may carry numerous transmission channels and numerous transmission links may be connected to a single monitoring system.

Each receive framer of the monitoring system monitors respective transmission links for a change of status or for occurrence of various events (collectively, "events"). For example, the events may include occurrence of an alarm condition, a change in signaling, a change in framer state, or reaching of a bit error counter threshold. Examples of alarm conditions include "loss of frame alignment", "loss of input", and "cyclic redundancy check failure" alarms.

When an event occurs on a particular transmission link, data relating to the event (e.g., the source of the event, the new state of the event if it relates to an alarm, or the new value of the event bits if it relates to a change in a signaling state) is received at receiving ports and is typically distributed and stored at various registers of the receive framer.

FIG. 1 is a block diagram of a transmission link monitoring system 20 in accordance with the prior art. This embodiment includes three receive framers 22, 24, 26, each of which is connected to three transmission links, 22a, 22b, 22c, 24a, 24b, 24c, 26a, 26b and 26c. Each receive framer is connected to, or in communication with, a microprocessor 28 of the monitoring system 20. When an event occurs on a transmission link, e.g., 22a, the associated receive framer, e.g., 22, sends an interrupt signal to the microprocessor 28, as shown at A in FIG. 1. The interrupt signal alerts the microprocessor to the existence or occurrence of the event, but does not include any data containing information about or relating to the event. The microprocessor 28, which is typically operating to perform an unrelated task of primary importance, stops performing the primary task and executes interrogation software. Using the software, the microprocessor 28 interrogates the receive framer 22 (as shown at B in FIG. 1) and any related hardware (not shown), if necessary, to determine all of the pertinent event data and address data relating to the event. This data is gathered, for example, by reading all storage locations of all registers and data ports of the receive framer and/or recognizing a port and/or channel number where the event occurred. The microprocessor then assembles the pertinent information into a message and forwards the message to a control system (not shown) for responding to the event. The microprocessor may then return to its primary task.

In typical prior art devices and systems, an interrupt signal has been sent to the microprocessor as the result of every event. Events may occur at random, unpredictable intervals and many events typically occur concurrently during service or as the result of a single equipment failure. As a result, subsequent interrupt signals may be sent to the microprocessor in rapid succession before the microprocessor has finished responding to an earlier interrupt signal. Accordingly, the microprocessor must be equipped with means, such as software, for managing such subsequent interrupt signals. Responding to such subsequent events limits the effectiveness of the microprocessor's performance of its primary task.

In another well-known arrangement, rather than rely upon interrupt signals, the microprocessor polls each receive framer at predetermined intervals, e.g., 10 milliseconds. In such an arrangement, a copy of all data stored in all storage locations and/or registers of all receive framers is temporarily retained and compared against data read during the next polling cycle to identify any changes indicating occurrence of an event. Since the transmission links and associated receive framers may be numerous, this arrangement is particularly burdensome and disruptive to the microprocessor and performance of the primary task. In addition, the time required to respond to an event may be lengthened by the polling interval.

Real-time software is typically required by the prior art devices and systems to enable the microprocessor to check the receive framers and to gather information relating to the event. Such software must be capable of handling numerous interruptions at rapid and/or irregular intervals. Such software is complex, expensive to develop, difficult to test, and prone to malfunction. Additionally, such software makes inefficient use of the microprocessor and limits the effectiveness of the microprocessor's performance of its primary task.

The burdens on the microprocessor and complexity of the software are increasing as the number of transmission links supported by a single receive framer increases. Whereas 1–4 transmission links were recently supported by a single receive framer sharing a single microprocessor, it is now common to support as many as 84 or more transmission links that may contain many thousands of possible event sources with a single integrated circuit and still share one microprocessor.

SUMMARY OF THE INVENTION

The present invention provides a transmission link monitoring system and method. The monitoring system includes a storage register, which is preferably capable of serving multiple transmission links, and an event monitor for each transmission link. Each event monitor is similar to a receive framer in that it preferably comprises circuitry that receives data relating to an event occurring on an associated transmission link. The event monitor differs from a receive framer in that it is configured to actively write the event data to a storage register. More specifically, the event monitor is configured to transmit a datastream to the register and to send a strobe signal to the storage register to signal the storage register to capture, i.e., store, an event data portion of the datastream when the event monitor detects a difference between old and new data at an address of a transmission link.

The monitoring system also includes an address sequencer for successively identifying addresses to the event monitor. The event monitor responsively transmits event data and/or other data corresponding to each address received from the address sequencer. The address sequencer also transmits the addresses (i.e., address data) to the storage register. Upon receipt of the strobe signal from the event monitor, the storage register captures, or stores, the address data received from the address sequencer and the corresponding event data received from the event monitor. Event data and related address data together form what is referred to herein as "a message" for use by a control system for responding to the event. The monitoring system preferably includes a signaling device for causing a microprocessor to read the message from the storage register.

Additional messages may be stored in the storage register and are read by the microprocessor on a first-in-first-out basis. Accordingly, messages resulting from events on any of various transmission links may be read from the storage register, thereby reducing burdens on the microprocessor. The microprocessor's burdens are further reduced because the preferred event monitor performs the function of forming messages comprised of the event data and address data without involvement of the microprocessor.

In one preferred embodiment, the storage register is capable of storing a status bit in association with each message. The status bit is toggled to a flag value when an associated message is stored in the storage register. In such embodiments, when the microprocessor reads a message from a storage field of the storage register, the microprocessor also reads the status bit of a next sequential storage field to determine whether a subsequent message is waiting to be read. While it is preferable that the microprocessor read the status bit in the next sequential storage field simultaneously with reading of the message from the preceding storage field, in alternate embodiments, the status bit may be read before or after the reading of the message from the preceding storage field. In either embodiment, the status bit is then cleared, i.e., reset to a default value, when the associated message has been read. If a message is waiting, the microprocessor reads the subsequent message before returning to its primary task. This eliminates the need for separate interrupt signals for each message and allows the microprocessor to operate more efficiently.

In another embodiment, the monitoring system includes a delay circuit. In this embodiment, the event monitor is configured to send a strobe signal to the delay circuit rather than to the signaling device. The delay circuit waits for expiration of a timer before causing the signaling device to signal the microprocessor to immediately leave its primary task and read data from the storage register. When the microprocessor reads data from the storage register, it also resets the timer. A subsequent event causing a subsequent message to be stored in the storage register at a time after the microprocessor begins reading the first message from a storage field will result in the event monitor sending a strobe signal to the delay circuit. However, the delay circuit will not cause the signaling device to send subsequent interrupt signal to the microprocessor until the timer has expired. This reduces interruptions to the microprocessor, allows it to operate more efficiently, and eliminates the need for complex interrupt management software.

DETAILED DESCRIPTION

The inventor has recognized that prior art event monitoring systems, in many important respects, are inadequate for and overly burdensome to the system microprocessor, particularly for a microprocessor serving numerous receive framers and numerous transmission links, as is presently common.

The present invention provides a transmission link monitoring system for collecting data relating to occurrence of an event independently of the microprocessor and for storing such data in a storage register readable by the microprocessor. Hardware is used to perform functions previously performed by complex software executed by the microprocessor. In particular, the present systems include an event monitor configured to write the event data to the storage register upon occurrence of an event.

Figure 1:
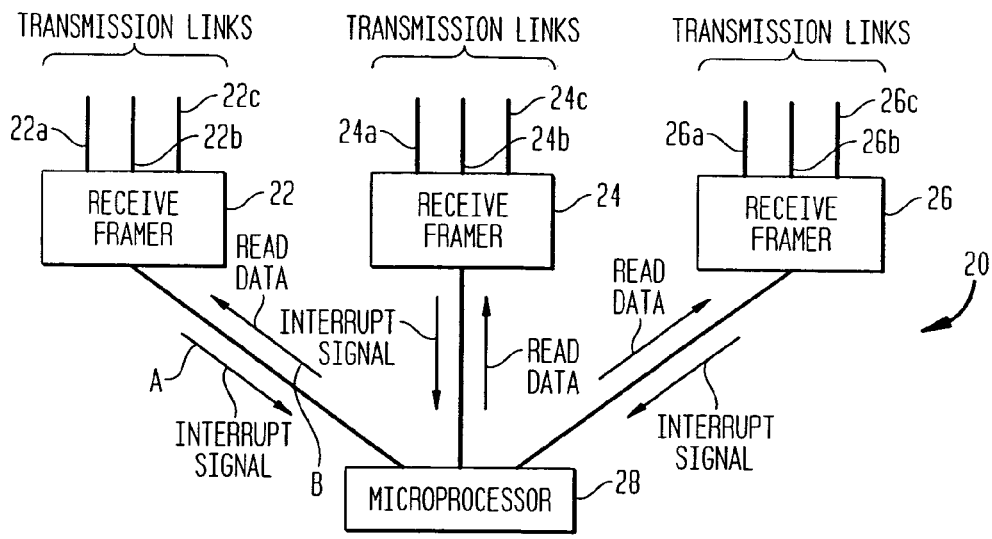
FIG. 1 is a block diagram of a transmission link monitoring system in accordance with the prior art.
Figure 2:
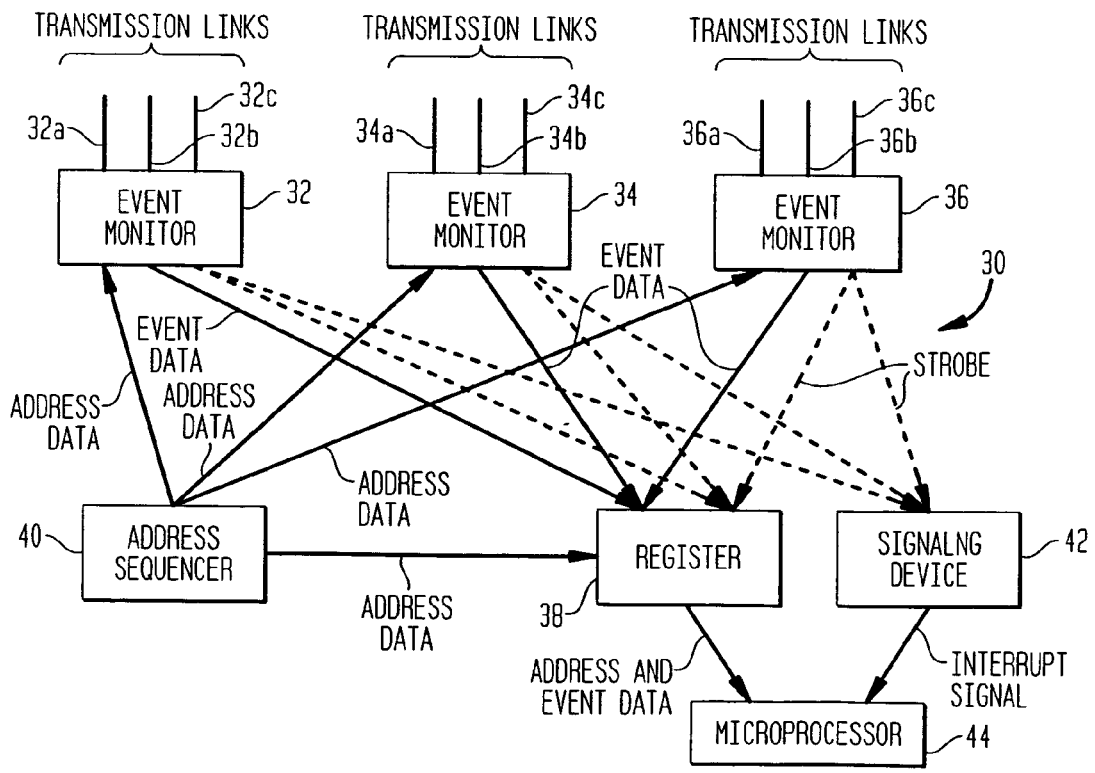
FIG. 2 is a block diagram of one embodiment of a transmission link monitoring system in accordance with the present invention.

FIG. 2 is a block diagram of a transmission link monitoring system 30 in accordance with one embodiment of the present invention. This embodiment includes three event monitors 32, 34 and 36, each of which is connected to three transmission links, 32a, 32b, 32c, 34, 34b, 34c, 36a, 36b and 36c. Each event monitor may be adapted from a prior art type receive framer, for example, by modifying and/or reconfiguring the receive framer to actively transmit, i.e., write, event data received via a transmission link and to include a memory and a monitoring circuit for comparing new event data with old event data stored in the memory. When the monitoring circuit determines a difference between old and new event data, it transmits a strobe signal, or pulse, to cause the event data reflecting the difference to be stored. The new event data is stored in the memory and the cycle repeats.

Figure 4:
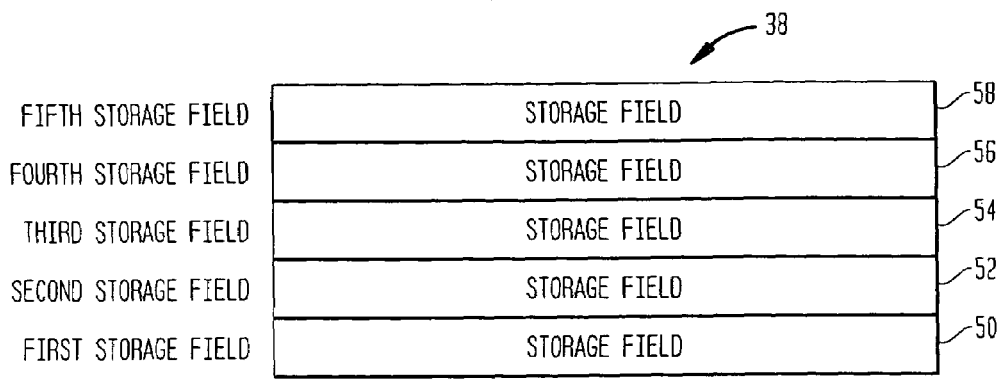
FIG. 4 is a logic diagram of a storage register in accordance with one embodiment of the present invention.

Each event monitor is connected to, or in communication with, a centralized storage register 38 of the monitoring system 30. FIG. 4 is a logic diagram of a storage register for use in a monitoring system in accordance with the present invention. As shown in FIG. 4, the storage register 38 has several storage fields 50, 52, 54, 56 and 58. A first-in-first-out (FIFO) memory register is preferred. Such registers and their operation are well known in the art and need not be discussed in detail herein. Generally, a FIFO memory register may be considered to function as a queue. Data written to the storage register is first stored in the first storage field 50, then in the second storage field 52, then in the third storage field 54, etc. Each time data is written to a storage field of the storage register, a write address counter is advanced to cause the next write operation to store data in the next sequential storage field. Data read from the storage register is first read from the first storage field 50, then from the next sequential second storage field 52 and so on. Each time data is read from a storage field of the storage register, a read address counter is advanced to cause the next read operation to read data from the next sequential storage field. The first data stored in the storage register is the first data read out of the storage register.

Figure 5:
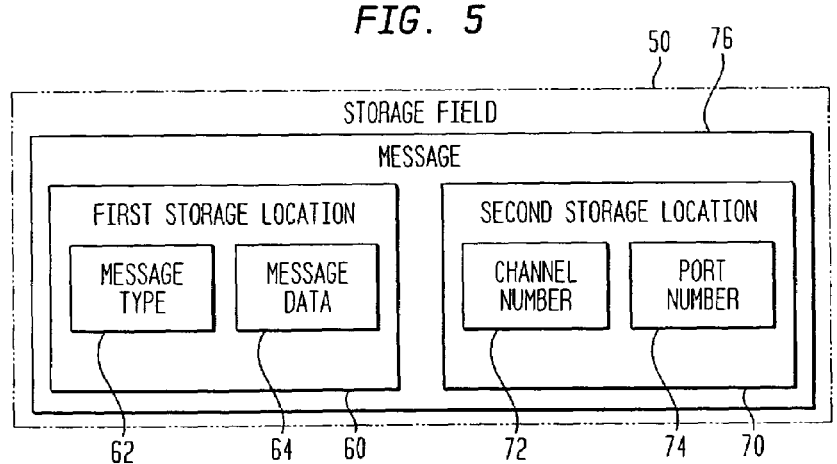
FIG. 5 is a logic diagram of storage of data in the storage register of FIG. 4 in accordance with one embodiment of the present invention.

FIG. 5 is a logic diagram of storage of data in the storage register 38 of FIG. 4 in accordance with one embodiment of the present invention. By way of example, FIG. 5 shows the logic of storage of data in the first storage field 50 shown in FIG. 4. Data may be stored in a similar fashion in the storage register's other storage fields 52, 54, 56 and 58. When an event occurs on a transmission link, e.g., 32a as shown in FIG. 2, the associated event monitor, e.g., 32, writes the event data to the storage register 38 for storage. For example, the event data may include data indicating the message type, e.g., link alarm, signaling data, or counter threshold, as well as message data relating to the event, e.g., the new state of an alarm, the new states of signaling data bits, or a label assigned to a particular error counter. For example, event data including a message type and message data are shown logically at 62, 64 in FIG. 5 as stored in the first storage location 60 of the first storage field 50.

Referring once again to FIG. 2, the monitoring system also includes an address sequencer 40 for transmitting address data to the event monitors, e.g. successively identifying addresses to the event monitors. For example, the address data may include channel and port numbers of the event monitor from which the event data originated. These addresses may be provided in sequential or non-sequential order. After all addresses have been included in the sequence, the sequence repeats. The event monitor responsively transmits event data and/or other data corresponding to the address received from the address sequencer 40. The address sequencer 40 also transmits the addresses to the storage register 38. Alternatively, the address sequencer simply recognizes the point of origination of the event data or address data from the event monitor. The address data is received by the register but is not stored unless a strobe signal is received by the storage register. When the strobe signal is received, the storage register 38 stores the address data in a storage location 70 of the same storage field, e.g., first storage field 50 as shown in FIG. 5. For example, address data including a channel number and a port number are shown logically at 54, 56 in FIG. 5 as stored in the second storage location 70 of the first storage field 50.

Each set of event data and related address data are collectively referred to hereafter as a "message." A message is shown logically at 76 in FIG. 5. After a complete message has been assembled at the storage register 38, an interrupt signal is sent to the microprocessor 44. Preferably, the signaling device 42 receives the strobe signal and responsively sends the interrupt signal to the microprocessor 44 as shown in FIG. 2. In response to the interrupt signal, the microprocessor 44 reads the message from the storage register 38. The microprocessor may then process the data in the message to appropriately respond to the event or transmit the data to a control system (not shown) for doing so. In an alternate embodiment, the strobe signal is sent directly to the microprocessor as an interrupt signal. In another alternate embodiment the microprocessor 44 reads the storage register 38 at predetermined intervals to check for a message.

In one embodiment, the signaling device 42 is configured with a message depth threshold, e.g., five messages. In such an embodiment, the signaling device will receive a strobe signal for each message, but will not send an interrupt signal to the microprocessor until the message depth threshold is reached, e.g., after five strobe signals/messages. This reduces interruptions to the microprocessor and allows it to operate more efficiently.

Figure 6:
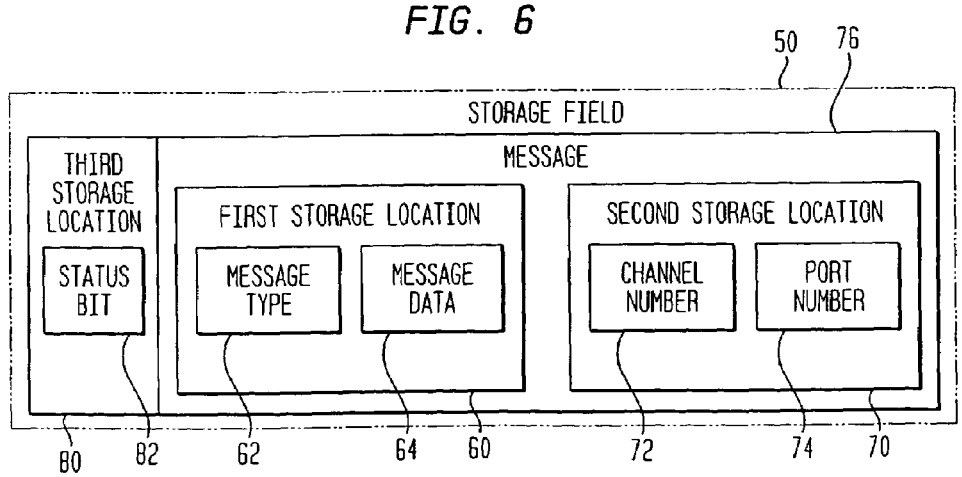
FIG. 6 is a logic diagram of storage of data in the storage register of FIG. 4 in accordance with an alternate embodiment of the present invention.

In one embodiment, each storage field of the storage register includes a third storage location for storing additional data in association with a message. FIG. 6 is a logic diagram of storage of data in accordance with such an embodiment. FIG. 6 shows the storage field 50, message 76 (including the same stored data as is shown in FIG. 5) and a third storage location 80 associated with the message 76 in the storage field 50. In this embodiment, each of the storage fields of the storage register is similarly configured.

The third storage location 80 is used to store additional data, such as a status bit, as shown at 82 in FIG. 6. In this embodiment, status bits in the register 38 are set to a default value, e.g., a "0", before storage of event data and address data in the corresponding first and second storage locations. The status bit of a storage field is then set to a flag value, e.g., a "1", upon storage of event data and address data in the first and second storage locations of the storage field. For example, the status bit may be set to the flag value by the strobe signal. Accordingly, the status bit can be used to determine whether an additional message is stored in the storage register and waiting to be read by the microprocessor. Specifically, when the microprocessor 44 reads data from the first and second storage locations 60, 70 of the first storage field 50 (preferably simultaneously, but alternatively before or after but generally concurrently), it also reads the status bit stored in the third storage location (not shown) of the second storage field 52.

If the status bit of the second storage field 52 is a "0", no messages are waiting to be read and the microprocessor 44 may return to its primary task. Alternatively, if the status bit in the second storage field 52 is a "1", an additional message is waiting in the second storage field 52 and the microprocessor 44 will read the message stored in the second storage field 52 from the storage register after reading the message stored in the first storage field and before returning to its primary task.

Accordingly, the microprocessor may read numerous messages sequentially without the need for issuance of a subsequent interrupt signal for each event, as was customary in the prior art. This results in considerably less disruption to the microprocessor and eliminates the need for complex software to handle multiple, frequent interrupt signals. Additionally, the microprocessor is alleviated of the burden of checking numerous receive framers and the burden of gathering address information relating to each event. This allows the microprocessor to devote more time to performance of its primary task than was previously possible.

Until now, events occurring in rapid succession resulted in transmission of interrupt signals to the microprocessor in rapid succession. The extreme disruption resulting to the microprocessor needed to be managed by complex software. The present invention provides for delaying of interrupt signals to the microprocessor. This allows data to be assembled at a centralized storage register as it occurs but the microprocessor to be interrupted at spaced intervals, thereby allowing for more effective use of the microprocessor between interruptions.

Figure 3:
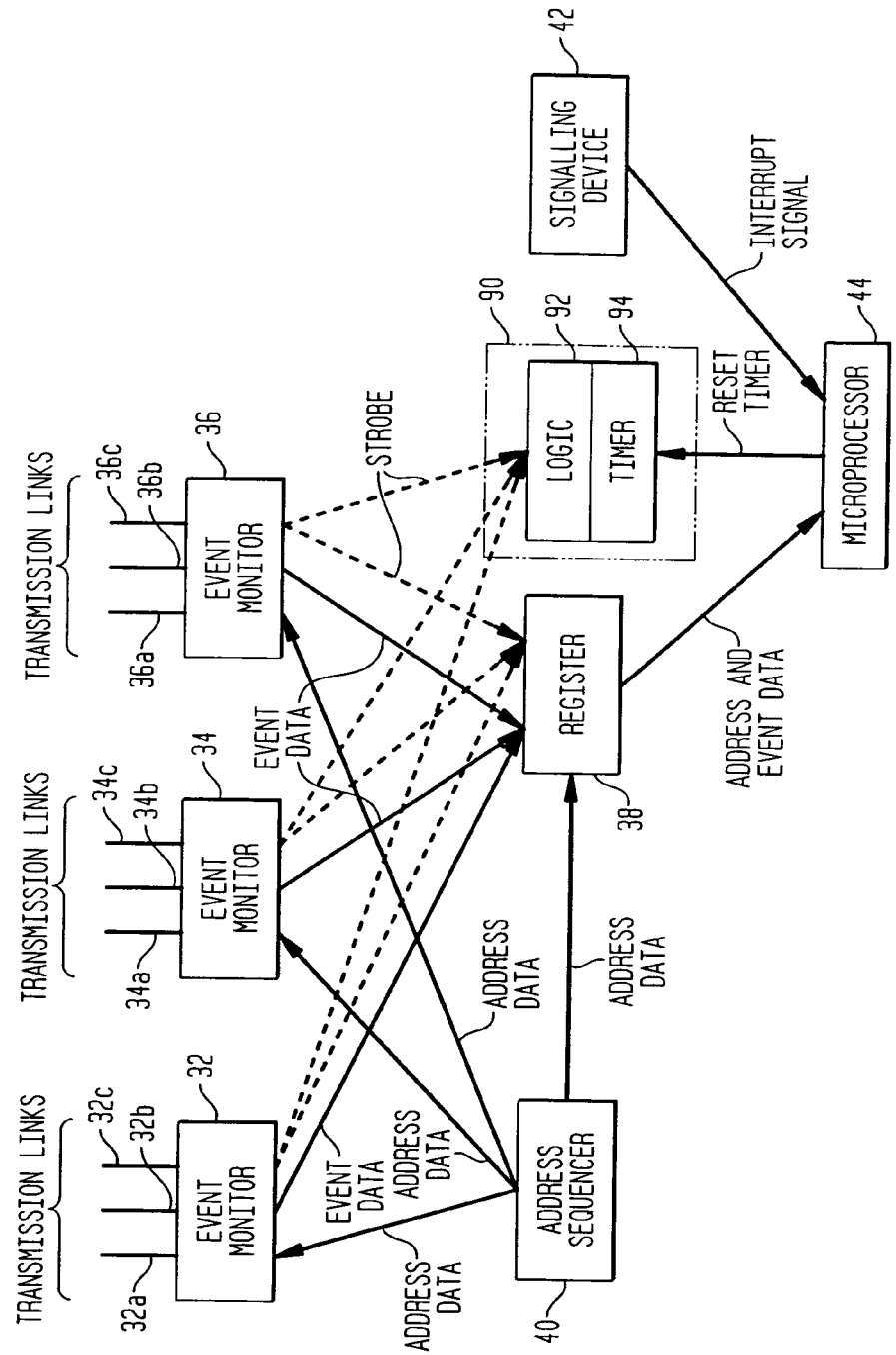
FIG. 3 is a block diagram of an alternate embodiment of a transmission link monitoring system in accordance with the present invention.

In one embodiment, the transmission link monitoring system 30' includes a delay circuit 90, as shown in FIG. 3. As described above, the event monitor sends a signal to the storage register 38 to cause capture of a message. However, in this embodiment the strobe signal is also sent to the delay circuit 90 rather than to the signaling device 42. The delay circuit 90 includes a logic circuit 92 and a timer 94. When the delay circuit 90 receives the strobe signal, it checks the timer 94, and the logic circuit 92 will not send a trigger signal to the signaling device 42 until after the timer has expired. Upon receipt of the trigger signal, the signaling device 42 may immediately send an interrupt signal to the microprocessor 44. The signaling device 42 then sends the interrupt signal to the microprocessor 44, which reads a message from the storage register 38 as discussed above. The microprocessor 44 then resets the timer 94. Optionally, this embodiment may further include use of a status bit or a message depth threshold, as described above. Using the delay circuit to delay subsequent interrupt signals permits the microprocessor to be used more effectively to perform its primary task.

It should be appreciated that, in alternate embodiments, the signals described above may be transmitted after storage of either the event data or the address data, or after both, as described above. The status bit default and flag values could be interchanged or a status bit sequence could be used. Alternatively, the status bit could be eliminated and the microprocessor could be used to read the storage register before returning to its primary task, the microprocessor reading and processing a subsequent message if one is present and returning to its primary task if one is not present.

Most existing receive framers provide for assembly of event data bits into a serial datastream. Accordingly, the method may be implemented by using a programmable logic device having a memory buffer for storing the datastream and a monitor for extracting relevant event data from the datastream. The programmable logic device may also be used to provide storage locations for use as a storage register.

Additionally, it should be noted that the storage register and/or event monitors could be configured to track more or less data, e.g., identification and storage of data identifying the message type could be eliminated if the system were configured to identify and store message data and address data for only a certain message type.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention.

Accordingly, the foregoing description is by way of example only, and not limiting. The invention is limited only as defined in the following claims and equivalents thereto.

What is claimed is:

1. A monitoring system for monitoring a plurality of signal-carrying transmission links for occurrence of an event, the system comprising:
   an event monitor connected to a plurality of transmission links, each of said transmission links having a respective transmission link address, said event monitor repeatedly receiving data from each of the plurality of transmission links, said event monitor having a memory for storing data for each of the addresses and a comparator for comparing previously received data stored in the memory to presently received data for each of the addresses;
   a storage register coupled to receive a datastream from said event monitor and to selectively store an event data portion of the datastream responsive to receipt of a predetermined signal;
   an address sequencer for successively generating and transmitting to said storage register address data corresponding to the transmission link addresses;
   said event monitor being connected to receive the address data from said address sequencer and responsively transmit to said storage register in the datastream data corresponding to each address, and to transmit said predetermined signal to said storage register when the comparator detects a difference between the previously received data stored in the memory and the presently received data for each of the addresses; and
   a signaling device connected to receive the predetermined signal from said event monitor and transmit an interrupt signal to cause a microprocessor to read the event data from said storage register responsive thereto.

2. The monitoring system of claim 1, wherein said address data is transmitted from said address sequencer to said storage register in a datastream and wherein said storage register stores the event data received from said event monitor and the address data received from said address sequencer corresponding to the event data responsive to receipt of the predetermined signal.

3. The monitoring system of claim 2, wherein said storage register associates in memory event data received from said event monitor with address data received from said address sequencer simultaneously with receipt of the event data.

4. The monitoring system of claim 1, further comprising the microprocessor for reading said storage register responsive to receipt of the interrupt signal.

5. The monitoring system of claim 1, wherein said signaling device is configured to transmit the interrupt signal to the microprocessor upon receipt of the predetermined signal from said event monitor.

6. The monitoring system of claim 1, wherein said signaling device is configured to transmit the interrupt signal to said microprocessor after receipt of a predetermined number of said predetermined signals.

7. The monitoring system of claim 1, wherein said event monitor comprises a plurality of event monitors.

8. The monitoring system of claim 7, wherein each address identifies a port of the event monitor and a channel of the transmission link on which the event occurred.

9. The monitoring system of claim 8, wherein the event data comprises a first dataset indicating a message type and a second dataset comprising message data.

10. The monitoring system of claim 2, wherein said storage register comprises first and second storage fields and each of said storage fields is writeable to store a bit value which is changeable between a default value, indicating an absence of either event data or address data in the bit value's respective storage field, and a flag value, indicating a presence of event data and address data in the bit value's respective storage field.

11. An event monitor for monitoring a transmission link connectable thereto, the event monitor comprising:
   means for receiving data from a transmission link;
   means for receiving address data from an address sequencer, the address data corresponding to addresses of the transmission link;
   means for storing data for each of the addresses;
   means for transmitting the presently received data for each of the addresses to a storage register;
   means for comparing previously stored data to presently received data for each of the addresses and for storing the presently received data for each of the addresses; and
   means for transmitting a predetermined signal to the storage register to cause the storage register to store the particular address and a related event data portion of the presently received data if a difference is detected between the presently received data and the previously stored data for a particular address.

12. A monitoring system for monitoring a plurality of signal-carrying transmission link for occurrence of an event, the system comprising:
   an event monitor connected to a plurality of transmission links having transmission link addresses, said event monitor receiving data from each of the plurality of transmission links and having a memory for storing data for each of the addresses and a comparator for comparing previously received data stored in the memory to presently received data for each of the addresses;
   a storage register coupled to receive a datastream from said event monitor and store an event data portion of the datastream responsive to receipt of a predetermined signal;
   an address sequencer for successively generating and transmitting to said storage register address data corresponding to the addresses;
   said event monitor being connected to receive the address data from said address sequencer and responsively transmit to said storage register in a datastream the data corresponding to each address, and to transmit said predetermined signal to said storage register when the comparator detects a difference between the previously received data stored in the memory and the presently received data for each of the addresses;
   a delay circuit connected to said event monitor for transmitting a trigger signal after expiration of a specified delay; and
   a signaling device connected to receive the trigger signal from said delay circuit and transmit an interrupt signal to cause a microprocessor to read the event data from said storage register responsive thereto.

13. The monitoring system of claim 12, wherein said delay circuit comprises a timer and a logic circuit for determining whether the timer has expired.

14. The monitoring system of claim 13, further comprising a microprocessor for reading said storage register responsive to receipt of the interrupt signal and for resetting the timer of said delay circuit.

\* \* \* \* \*